UNITED STATES PATENT OFFICE.

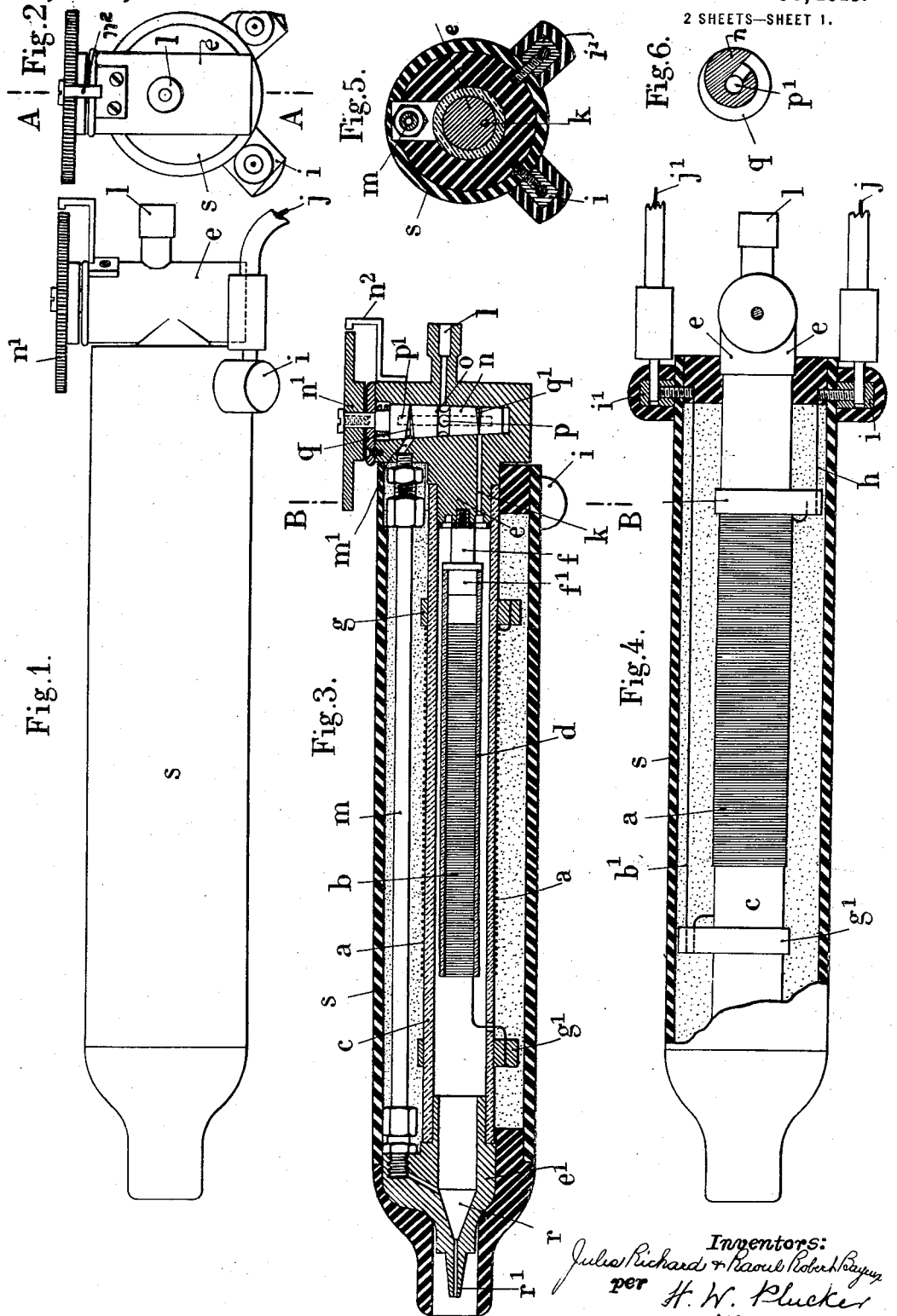

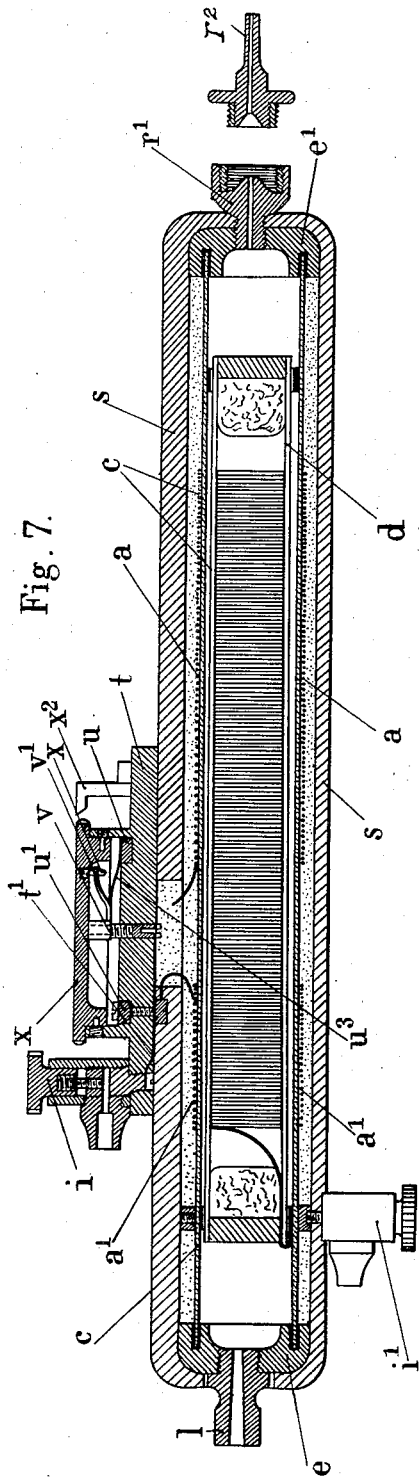
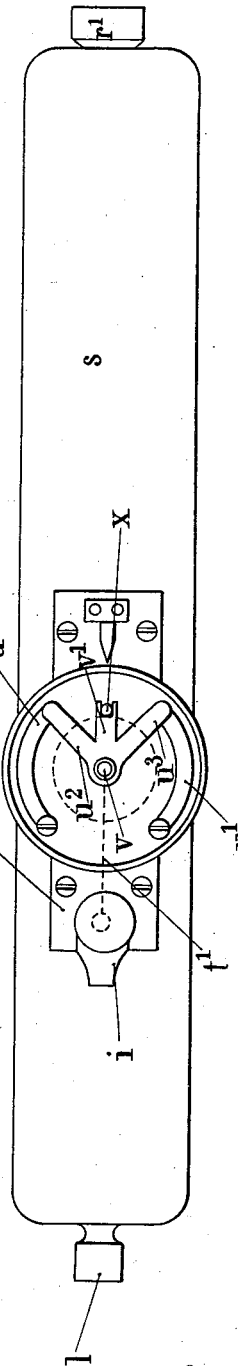
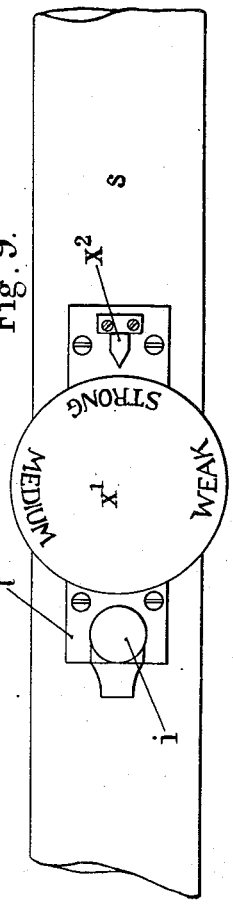

RAOUL ROBERT BAYEUX AND JULES RICHARD, OF PARIS, FRANCE.

OZONIZING APPARATUS.

1,326,631.      Specification of Letters Patent.      Patented Dec. 30, 1919.

Application filed June 8, 1918. Serial No. 239,034.

*To all whom it may concern:*

Be it known that we, RAOUL ROBERT BAYEUX, of 52 Avenue Kléber, Paris, and JULES RICHARD, of 25 Rue Mélingue, Paris, in the Republic of France, have invented Improvements in or Relating to Ozonizing Apparatus, of which the following is a full, clear, and exact decription.

The present invention has for its object an apparatus intended to produce ozone by means of pure oxygen and the mixture of the ozone produced thereby with the oxygen in fixed proportions capable of being regulated at will.

This apparatus is characterized by the combination of two concentric windings or solenoids which are independent and carried by glass tubes, and each connected to one pole of the secondary winding of an induction coil; of an oxygen supply pipe preferably concentric with the ozonizer, and of a special stop cock connected to the oxygen supply pipe and so combined as to allow of the distribution, in variable and fixed proportions, of oxygen in the ozonizer and of pure oxygen in a tube parallel with this latter.

The present invention has also for its object a modified constructional form of the apparatus which permits of insuring, between the extreme limits of the ozonizing power of this latter, of known variations in the production of the ozone by causing the surface of the sheet of effluvium to vary instantly.

To this end, the external winding or solenoid is divided into two or a greater number of parts adapted to be set in action either separately or simultaneously so as to obtain at option either the whole of the electric power, or a fraction of that power, and consequently to impart to the apparatus an ozonizing power variable at will during the course of an operation or an experiment without interrupting the working of the apparatus.

By way of example the invention is shown in the accompanying drawing in which:—

Figure 1 shows in elevation the ozonizer which forms the subject matter of the present invention.

Fig. 2 is an end view thereof.

Fig. 3 is a longitudinal vertical section on the line A—A of Fig. 2.

Fig. 4 is a horizontal section of the same apparatus with certain parts developed.

Fig. 5 is a transverse section on the line B—B of Fig. 3.

Fig. 6 is a section on a larger scale of the plug of the stop cock.

Fig. 7 shows in vertical longitudinal section the ozonizer arranged so as to allow the surface of the sheet of effluvium to be varied.

Fig. 8 is a plan view thereof, the operating knob which allows the power of the apparatus to be varied being removed.

Fig. 9 shows also in plan this arrangement provided with its operating knob.

As shown in the drawing, the present apparatus has an ozone producing device formed by two concentric solenoids $a$ and $b$ independent of each other, the first being wound on the outer surface of a glass tube $c$ and the second in the interior of a second glass tube $d$ contained within the first one.

The glass tube $c$ is fixed at its ends to two supports $e$ and $e'$ of any suitable material.

The tube $d$ is connected to the support $e$ by a spindle $f$ fixed to the said support and carrying a cylindrical stopper $f'$ which fits into the tube $d$.

One end of each of the solenoids $a$ and $b$ is sealed to the glass of the tubes $c$ and $d$. The other ends of these solenoids are connected to metal rings $g$ and $g'$ fixed on the tube $c$.

The rings $g$ and $g'$ serve as terminals and are completely separated from each other. They are connected by wires $h$ and $h'$ to two terminals $i$ and $i'$ respectively and further connected by insulated wires $j$ and $j'$ (Fig. 4) to an induction coil.

The annular space between the two tubes of glass $c$ and $d$ carrying the solenoids $a$ and $b$ may be traversed by a current of pure oxygen admitted through a passage $k$ in the support $e$.

This passage is connected by a stop cock of special construction to a union $l$ to which is attached the reservoir of oxygen. This stop cock also permits of the passage of the oxygen through a metal pipe $m$ arranged parallel with the ozonizer, the ends of which are connected to the supports $e$ and $e'$.

The distributing stop cock for the oxygen has a plug $n$ fitted into a bush formed in the support $e$ and adapted to be operated by a knob $n'$ bearing graduations moving in front of a fixed index $n^2$.

The plug $n$ of the stop cock has opposite the union $l$ which supplies the pure oxygen, a circular groove $o$ which communicates by openings $p$ with a passage $p'$ cut in the axis of the plug and closed at both ends.

This central passage further communicates by two grooves $q$ $q'$ cut in the periphery of the plug $n$, the first one by means of a passage $m'$ with the tube $m$ which supplies the pure oxygen to the end of the apparatus; the second one $q'$ communicates through passage K with the annular space between the two dielectrics in which the oxygen is ozonized.

The grooves $q$, $q'$ extend over only a portion of the periphery of the plug and their height as well as their depth decrease as shown in Figs. 3 and 6.

On the other hand, the grooves $q$ and $q'$ are arranged in opposite directions on the plug of the stop cock in such a way that according to the position of this plug, the apparatus can emit pure oxygen or not or progressively mixtures of pure oxygen and ozone, up to the maximum quantity which the apparatus can deliver.

It is therefore possible to regulate exactly the proportion of ozone and pure oxygen passing through the apparatus, a relatively considerable movement of the operating knob $n'$ of the stop cock corresponding to a very small angular movement of the plug of the latter.

The ozone produced by the ozonizer and the pure oxygen passing through the tube $m$ mix in a chamber $r$, formed in the support $e'$, and terminated by a union $r'$ on which may be mounted either a hypodermic needle or the like for injections, or any conducting pipe or tube.

The whole of the parts of the apparatus, except the stop cock are contained in a casing of insulating material $s$, preferably of ebonite, provided with terminals $i$ and $i'$ also covered with a capsule of insulating material.

The casing $s$ is filled with paraffin in which are buried the glass tube $c$ and the metal tube $m$ which delivers directly to the outlet of the apparatus the pure oxygen which is not electrically influenced and is consequently not ozonized.

Figs. 7 to 9 of the drawing show a modified constructional form of the apparatus which will be described constructed for the following purpose:

Experience has shown that at the limits of ozonizing power of the apparatus illustrated in Figs. 1 to 6, the upper limit depending on the power of the coil producing the effluvium, on the surface of the sheet of effluvium etc., and the lower limit characterized by the quantity which the apparatus produces with relation to the speed of the supply of oxygen, and such that below a certain supply the quantity of ozone diminishes the mixtures of oxygen and ozone determined by the operation of the stop cock are effective that is to say the quantity of ozone formed at the outlet of the apparatus varies more or less.

Experience has also shown that between these extreme limits the mixtures determined by the stop cock are necessarily proportional to the reciprocal supplies of the gas in the outer tube and in the dielectric space, and that furthermore these variations cannot be expressed by figures.

The apparatus shown in Figs. 7 to 9 is combined so as to insure the above specified limits of the variations known in the production of ozone.

In this apparatus the casing of insulating material $s$ has at its ends two tubes, $l$ and $r'$ intended to receive the one the supply pipe for the pure oxygen and the other a nozzle $r^2$ on which may be mounted the hypodermic syringe, the cannula for injections or any conducting pipe as has been described above.

The winding of the outer solenoid of this apparatus is divided into two parts $a$ and $a'$ of unequal dimensions, which are connected to the terminal $i$ in the following manner.

Upon a small plate $t$ of insulating material fixed to the casing $s$ and carrying the terminal $i$, are arranged two contacts $u$ and $u'$ to which are connected the ends of the two parts of the solenoids $a$ and $a'$ their other ends being sealed into the glass tube $c$ as in the preceding apparatus.

With the contacts $u$ and $u'$ are adapted to come into contact the arms $u^2$ and $u^3$ of a commutator the spindle $v$ of which is connected by a wire $t'$ to the terminal $i$.

This commutator has between the two arms $u^2$ and $u^3$ a finger $v'$ provided with a notch in which engages a lug $x$ integral with an operating knob $x'$ adapted to move in front of a fixed index $x^2$. The arms $u^2$ and $u^3$ of the commutator, are arranged in the form of a V so as to be able to come into contact simultaneously with the ends of the contacts $u$ and $u'$.

The operation of this device will be easily understood by reference to the drawing.

When the two arms of the commutator are in the position shown in Fig. 3, the position in which these arms are in contact simultaneously with the contacts $u$ and $u'$, the current supplies the two solenoids $a$ and $a'$ simultaneously. The maximum of electric power is thus obtained and consequently the maximum ozonizing power of the apparatus.

By turning the operating knob $x'$ toward the left in Fig. 8, the arm $u^3$ of the commutator ceases to be in contact with the contact $u'$, while the arm $u^2$ remains in contact with the contact $u$. Under these conditions the electric current only passes through the longer fraction $a$ of the solenoid so that a medium electric power is obtained and a medium ozonizing power of the apparatus.

By turning, on the contrary the operating knob $x'$ toward the right, the arm $u^3$ of the commutator is brought into contact with the contact $u'$ and the arm $u^2$ ceases to be in contact with the contact $u$. The electric current will therefore pass only through the shorter fraction $a'$ of the solenoid reducing thus the electric power and that of the ozonizing power of the apparatus which supplies only a small quantity of ozone.

In order to allow the position of the commutator to be ascertained the operating knob $x'$ bears the words " Strong," "Medium" and "Weak" opposite indicator points which are brought opposite the fixed index $x^2$ to obtain the desired power (see Fig. 9).

It will be seen that by means of this arrangement the instrument can have imparted to it an ozonizing power variable at will.

In the accompanying drawing the outer solenoid is shown divided into two parts, but it must be quite understood that this number may be augmented if thought convenient. The commutator will in such case be so arranged as to allow of the passage of the current either through one only of these parts of the solenoid, or through all of them, or through any number of them.

The oxygen passing through the annular space comprised between the glass tubes $c$ and $d$ is admitted into the apparatus either directly by the tube $l$, or through the medium of the stopcock above described.

The proportional ozonizing apparatus constituting the subject matter of the present invention offers the following principal advantages:—

1. It is very portable by reason of its light weight and exceptionally handy by reason of its small dimensions.

2. It allows exact mixtures of ozone and pure oxygen to be produced at will.

3. It also allows the surface of the sheet of effluvium to be varied at will.

4. Owing to the choice of the materials of which it is composed (glass, aluminium, wires of solenoids buried in paraffin) it cannot be deteriorated by the ozone.

5. Finally, the apparatus insures absolute protection to the operator, on the one hand by means of the casing of insulating material which protects him against the high frequency currents passing through the ozonizer and on the other hand by the paraffin contained in the interior of the apparatus.

What we claim and desire to secure by Letters Patent of the United States is:—

1. A proportional ozonizer comprising two independent concentric solenoids each to be connected to one pole of the secondary winding of an induction coil, terminals for the wires for supplying the current, glass tubes for carrying these solenoids, a supply pipe for oxygen, means for causing the quantity of oxygen admitted into the apparatus to be varied and means for insulating the latter.

2. A proportional ozonizing apparatus comprising two independent concentric solenoids each to be connected to one pole of the secondary winding of an induction coil, terminals for the wires for supplying the current, glass tubes for carrying these solenoids, an oxygen supply pipe for oxygen opening at one of the ends of the apparatus into the annular space comprised between the two glass tubes, a mixing chamber arranged at the other end of the apparatus and communicating with an outlet nozzle, means for causing the quantity of oxygen admitted into the apparatus to be varied and means for insulating the latter.

3. A proportional ozonizing apparatus comprising two independent concentric solenoids each to be connected to one pole of the secondary winding of an induction coil, terminals for the wires for supplying the current, glass tubes for carrying these solenoids, an oxygen supply pipe opening at one of the ends of the apparatus into the annular space comprised between the two glass tubes, a mixing chamber arranged at the other end of the apparatus, an outlet nozzle communicating with said chamber, a metal tube adjoining this chamber and adapted to be put into communication with the oxygen supply, means for causing the quantity of oxygen admitted into the apparatus to be carried and means for insulating the latter.

4. A proportional ozonizing apparatus comprising two independent concentric solenoids each to be connected to one pole of the secondary winding of an induction coil, terminals for the wires for supplying the current, glass tubes for carrying these solenoids, a supply pipe for oxygen opening at one of the ends of the apparatus into the annular space comprised between the two glass tubes, a mixing chamber arranged at the other end of the apparatus, an outlet nozzle communicating with said chamber, a metal tube adjoining this chamber on the one hand and adapted on the other hand to be put into communication with the oxygen supply, a stop cock for causing the quantity of oxygen admitted into the apparatus to vary and means for insulating the latter.

5. A proportional ozonizing apparatus comprising two independent concentric solenoids, each to be connected to one pole of the secondary winding of an induction coil, terminals for the wires for supplying the current, glass tubes for carrying these solenoids, supply pipe for the oxygen opening at one of the ends of the apparatus into the annular space comprised between the two glass tubes, a mixing chamber arranged at the other end of the apparatus, an outlet nozzle for the ozone communicating with said chamber, a metal tube adapted to be put into communication on the one hand with the oxygen supply and opening on the other hand into the mixing chamber to allow pure oxygen to be brought into this chamber, a stop cock having two grooves of decreasing height and depth arranged respectively opposite the pipe opening into the glass tubes and the metal tube, these grooves being arranged in opposite directions for causing the proportions of oxygen admitted into this pipe or between the tubes to be varied at will, a knob moving in front of an index for operating the stop cock and means for insulating the apparatus.

6. A proportional ozonizing apparatus comprising two independent concentric solenoids, each to be connected to one pole of the secondary winding of an induction coil, terminals for the wires for supplying the current, glass tubes for carrying these solenoids, a supply pipe for the oxygen opening at one of the ends of the apparatus into the annular space comprised between the two glass tubes, a mixing chamber arranged at the other end of the apparatus, a nozzle for the outlet of the ozone communicating with said chamber, a metal tube adapted to be put into communication on the one hand with the oxygen supply and on the other hand opening into the mixing chamber to allow pure oxygen to be brought into this chamber, a stop cock having two grooves of decreasing height and depth arranged respectively opposite the pipe opening between the glass tubes and the metal tube, these grooves being arranged in opposite directions for causing the proportions of oxygen admitted into this pipe or between the tubes to vary at will, a knob moving in front of an index for operating the stop cock, a casing of insulating material inclosing the solenoids, the metal tube and carrying the stop cock, and paraffin run between the external glass tube and the wall of the casing for insulating the apparatus.

7. A proportional ozonizer comprising two independent concentric solenoids each to be connected to the pole of the secondary winding of an induction coil, the outer solenoid being divided into segments adapted to be set in operation either separately or simultaneously to allow the sheet of effluvium to be varied, glass tubes for carrying these solenoids, terminals for the wires for supplying the current, a pipe for supplying the oxygen and a nozzle for the outlet of the ozone and a casing of insulating material filled with paraffin containing the solenoids.

8. A proportional ozonizing apparatus comprising two independent concentric solenoids each to be connected to the pole of the secondary winding of an induction coil, the outer solenoid being divided into segments adapted to be set in operation either separately or simultaneously to permit the sheet of effluvium to be varied, a commutator comprising a plurality of arms and an operating knob therefor, contacts connected respectively to the segments of the outer solenoid and with which the arms of the commutator can be brought separately or simultaneously into contact to obtain a fraction or the whole of the electric power, glass tubes for carrying the solenoids, terminals for the wires for supplying the current, one of said terminals being connected to said commutator a pipe for supplying oxygen and a nozzle for the outlet of the ozone, and a casing of insulating material filled with paraffin containing the solenoids and carrying the commutator and the contact studs therefor.

The foregoing specification of our improvements in or relating to ozonizing apparatus signed by us this sixth day of May, 1918.

RAOUL ROBERT BAYEUX.
JULES RICHARD.

Witnesses:
P. HENDERSON,
PETER PETERSEN.